March 8, 1960 J. A. BRADFORD 2,927,527
APPARATUS FOR MARKING AND COUNTING CONTAINERS
Filed April 20, 1956 8 Sheets-Sheet 1
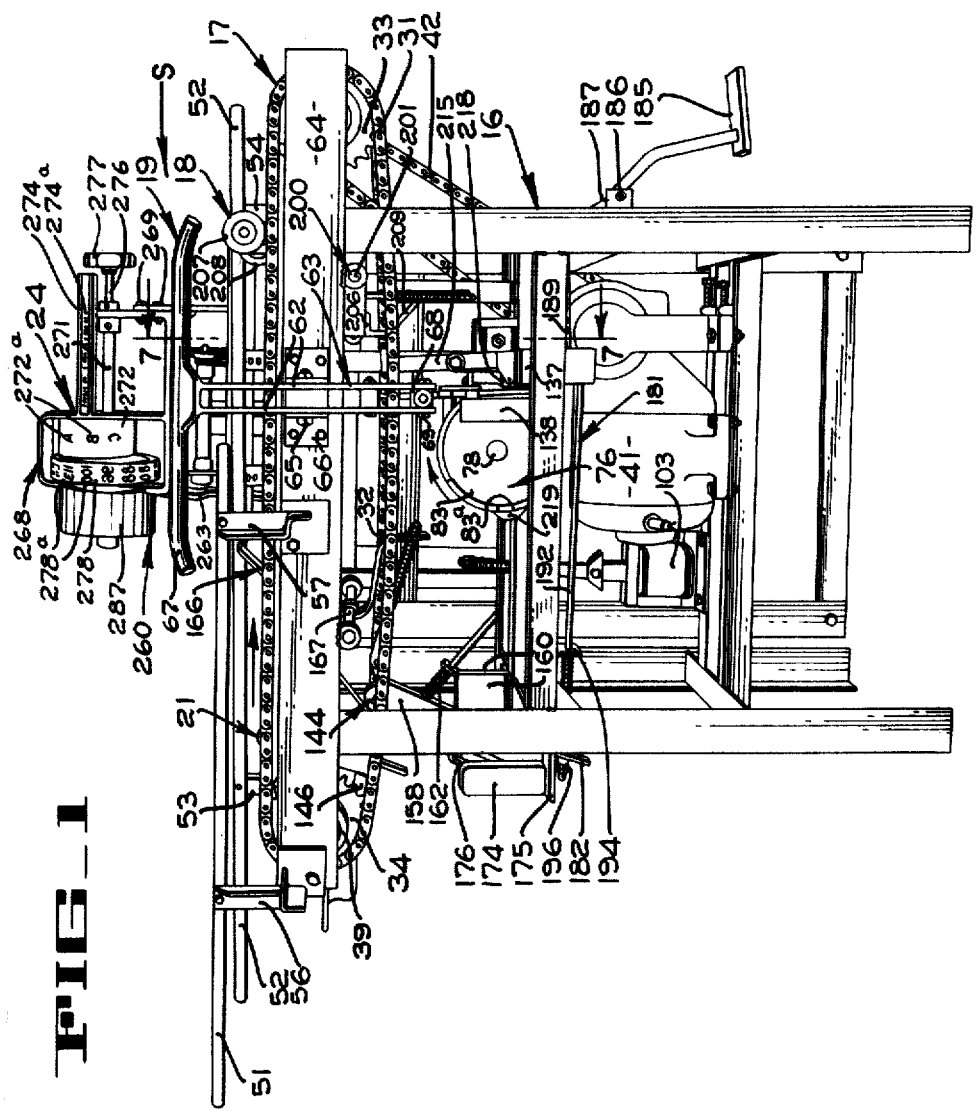
FIG_1
INVENTOR
JOHN A. BRADFORD
BY *Hans G. Hoffmeister*
ATTORNEY

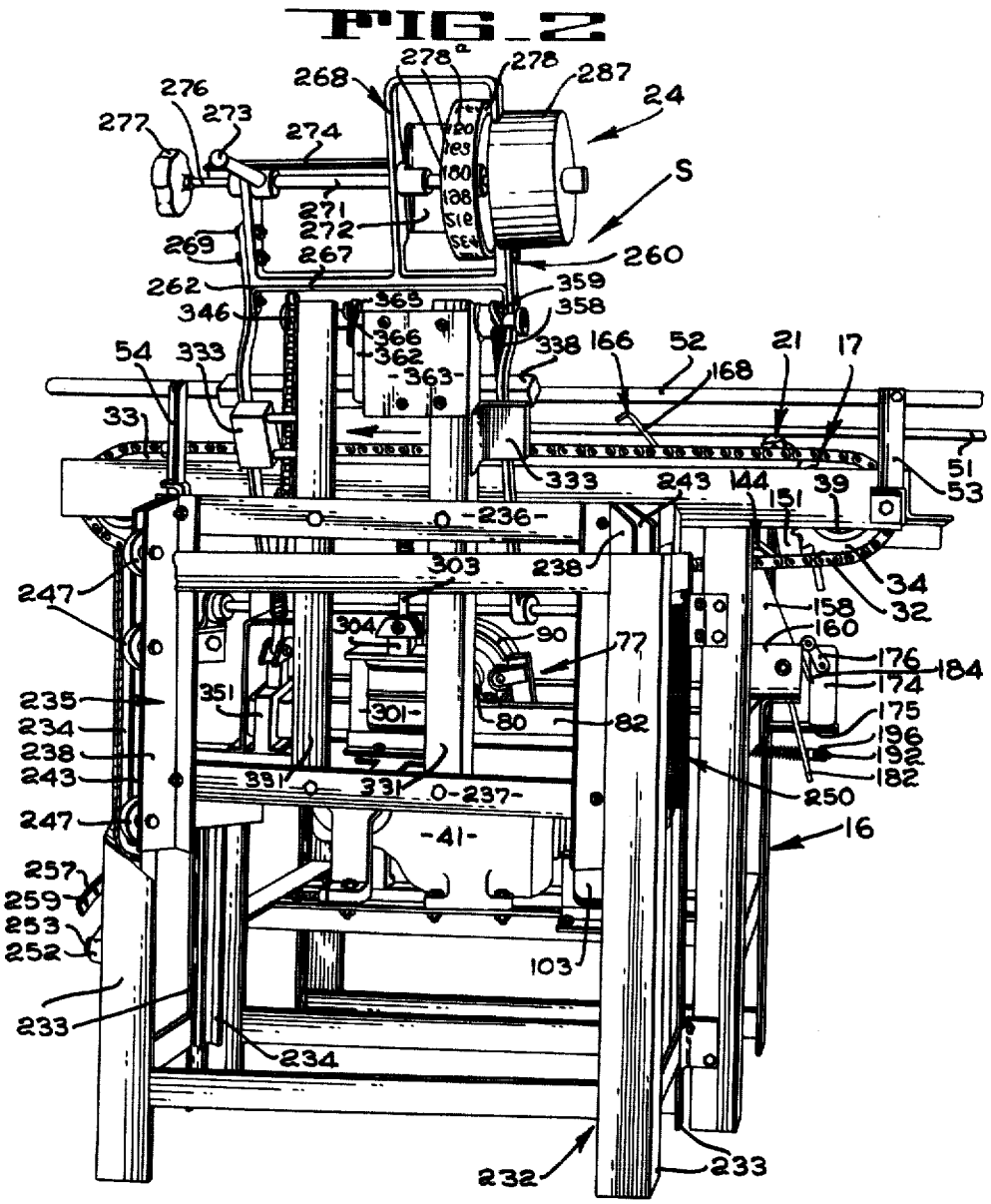

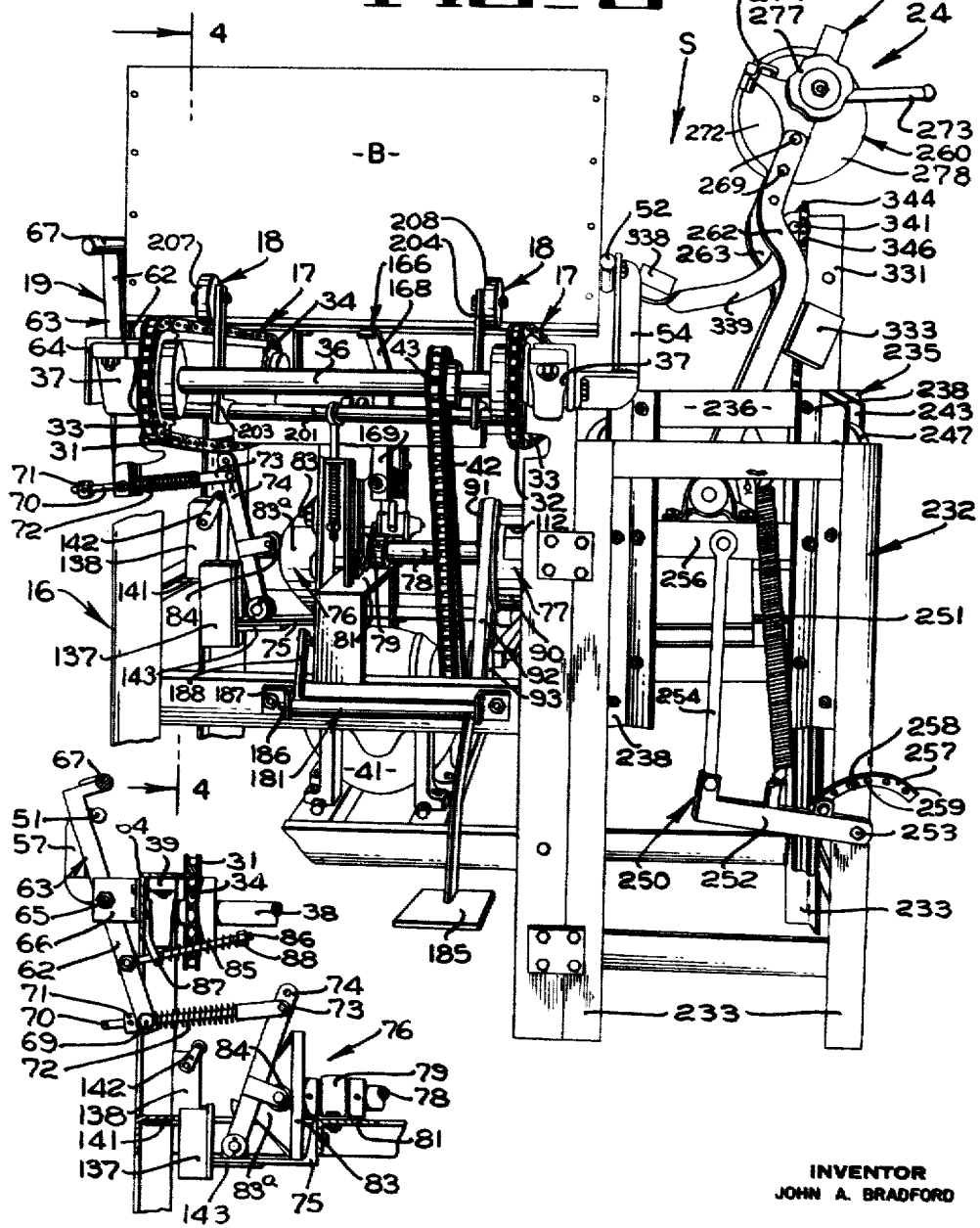

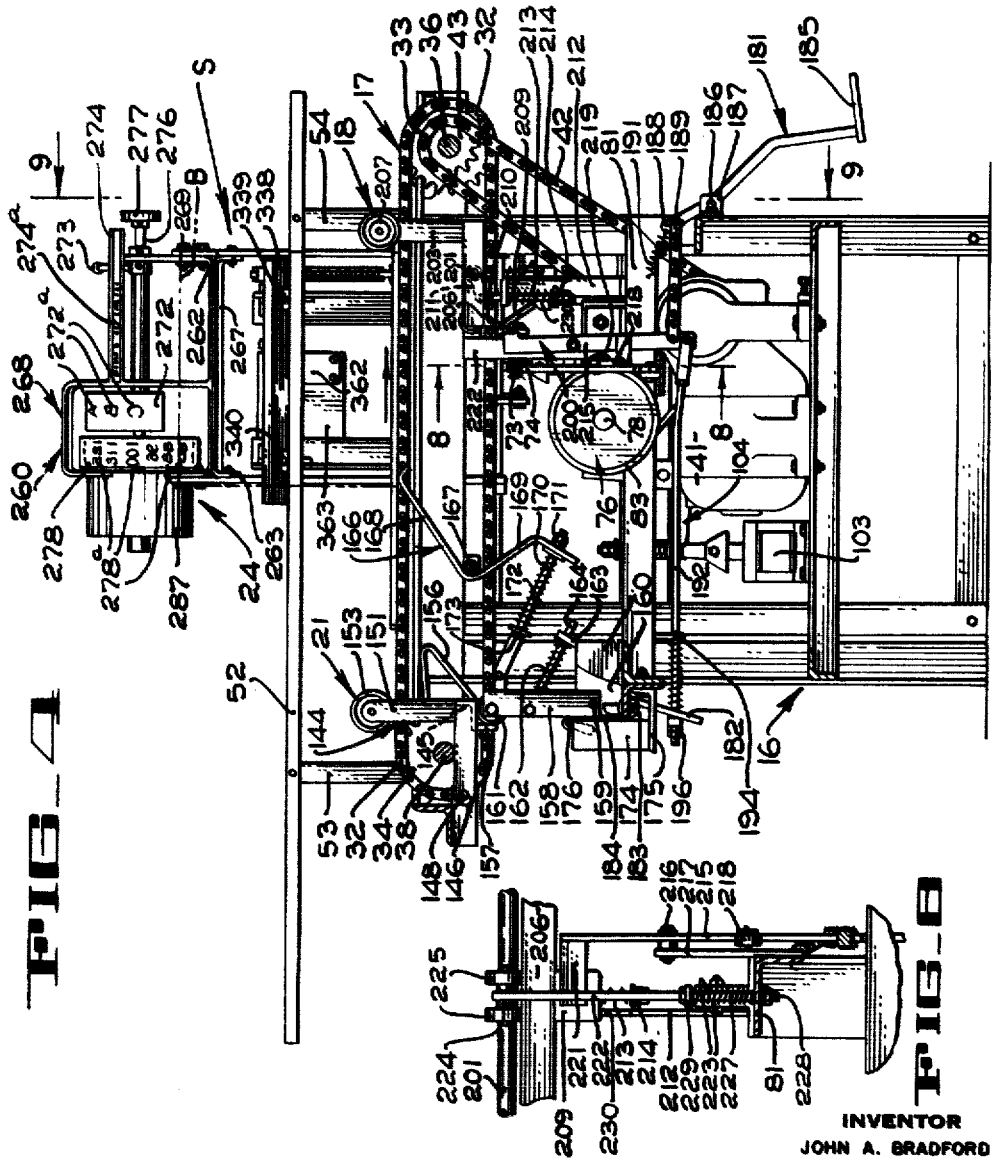

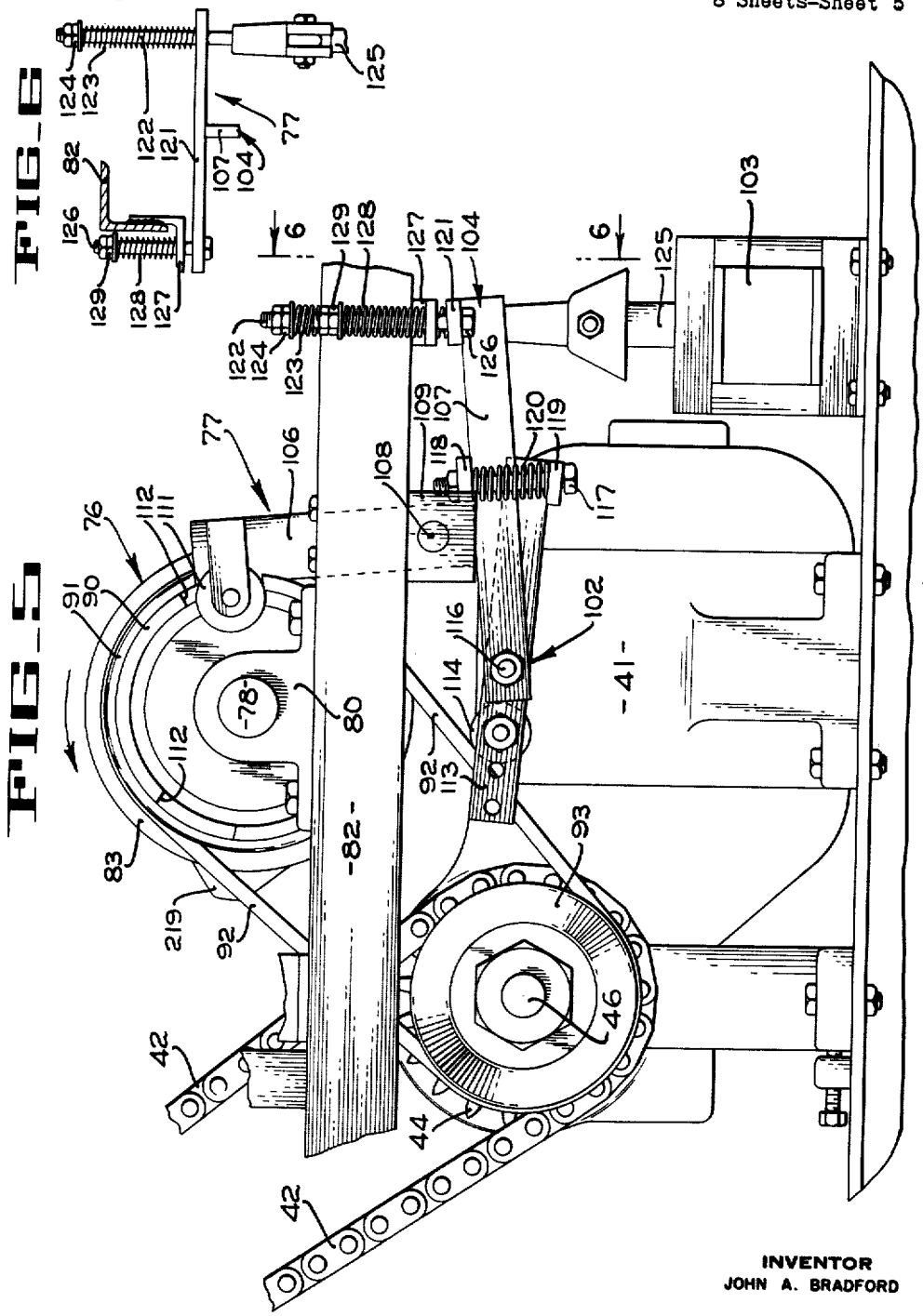

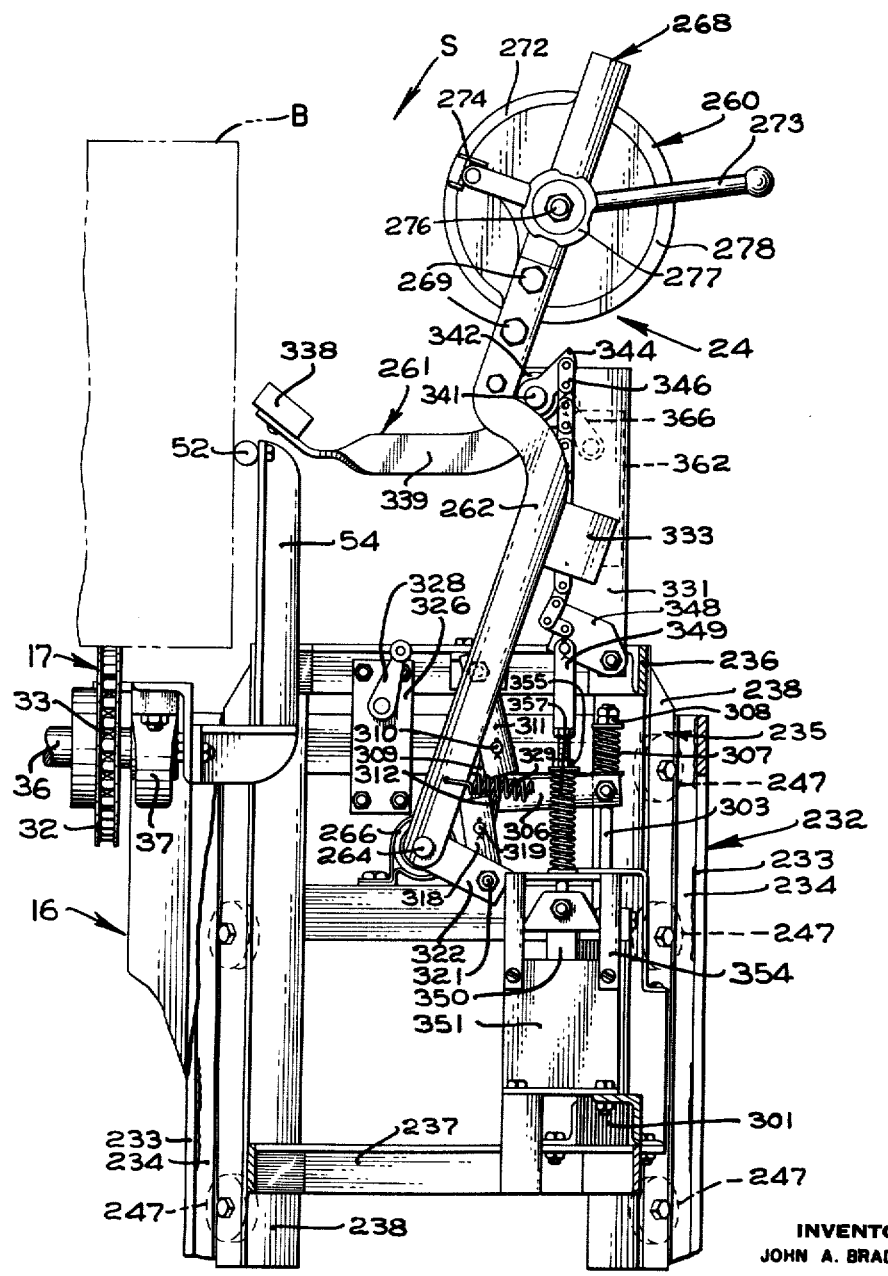

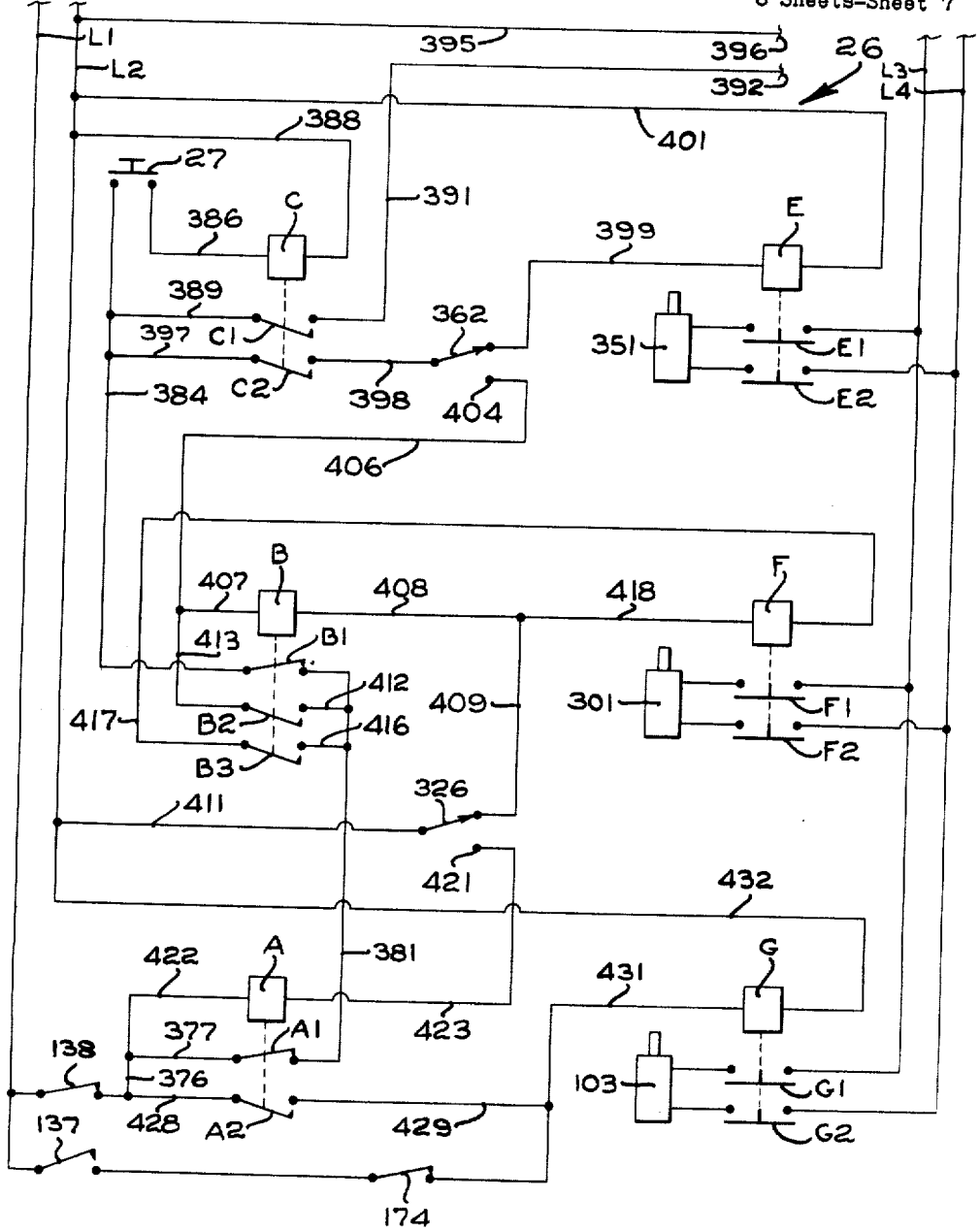
FIG_10

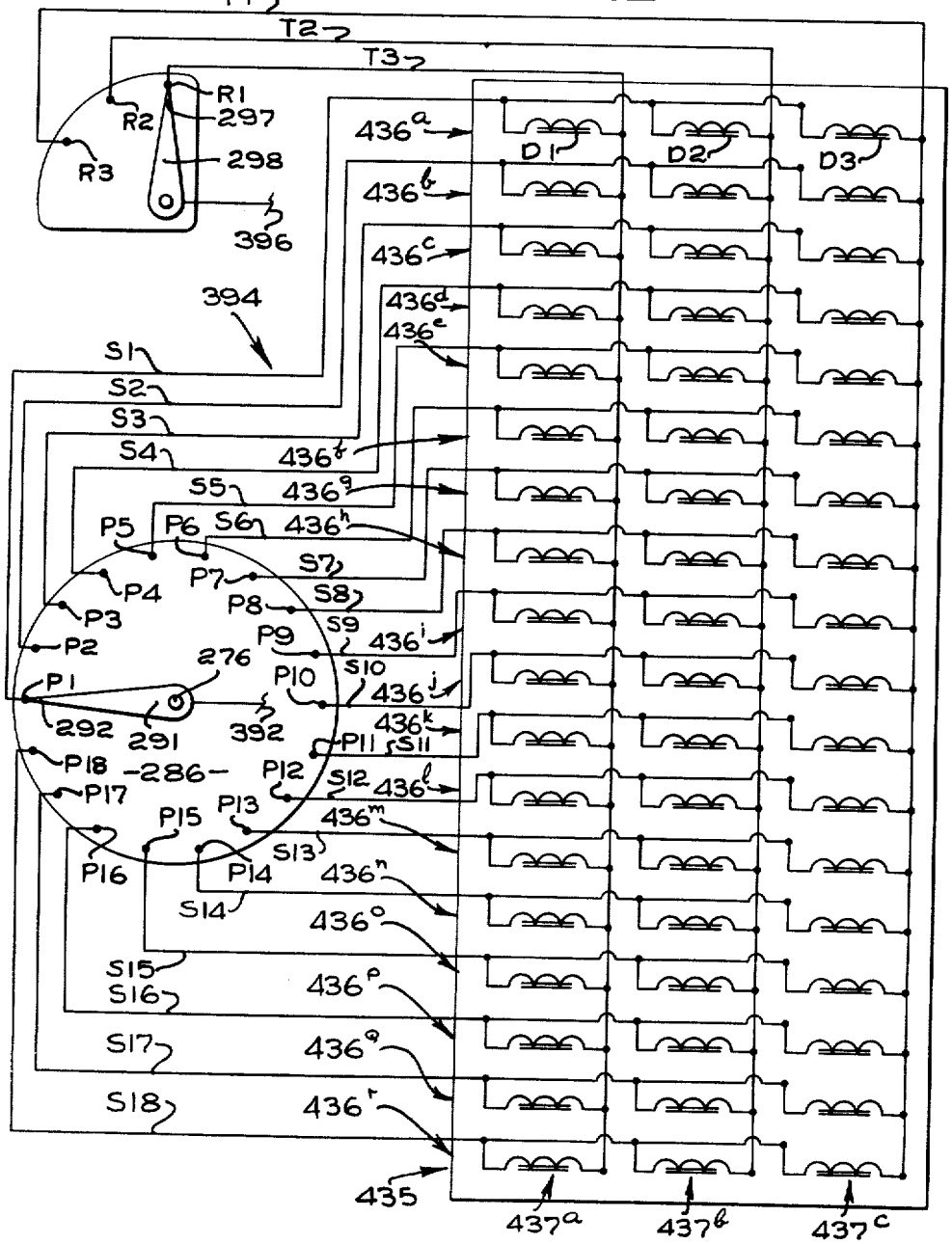
March 8, 1960  J. A. BRADFORD  2,927,527
APPARATUS FOR MARKING AND COUNTING CONTAINERS
Filed April 20, 1956  8 Sheets-Sheet 8
FIG_11
INVENTOR
JOHN A. BRADFORD

United States Patent Office 2,927,527  
Patented Mar. 8, 1960

2,927,527
APPARATUS FOR MARKING AND COUNTING CONTAINERS

John A. Bradford, Wenatchee, Wash., assignor to Food Machinery and Chemical Corporation, San Jose, Calif., a corporation of Delaware Application April 20, 1956, Serial No. 579,660

9 Claims. (Cl. 101—43)

This invention appertains to an apparatus for marking and counting containers and more specifically relates to a machine which after stopping a container to be marked, can be selectively regulated to mark the container according to size and grade of produce contained therein, and which automatically records the number of containers marked according to each size and grade classification.

In the fruit packing industry, it is common practice to employ an operator to visually determine the size and grade of fruit contained in each box in an advancing succession of packed boxes and to then mark each box to indicate the particular size and grade of fruit therein. The operator is required to keep an accurate count of the number of boxes containing each grade and size of fruit. Since only one size and one grade, out of as many as forty-eight or more separate and distinct size and grade classifications must be marked on each box, and each box must be counted according to its particular classification, the operator's job becomes very tedious and subject to errors.

Not only is an operator apt to commit such errors as failing to count, double counting, and recording the count of a box in a grade and size other than the one marked on the box, but he may also illegibly mark the boxes or may mark the boxes in various locations which may easily be overlooked or confused with other markings already on the boxes thus making future identification difficult. Consequently, the commonly employed method of grade marking and counting of boxes of fruit is subject to both improper identification of produce contained in the boxes, and to inexact count of the number of boxes containing each particular grade and size of produce.

It is, therefore, an object of this invention to provide apparatus which will mark boxes according to the size and the grade classification of the produce contained in each box, and which will automatically record the number of boxes marked according to each classification.

Another object is to provide an apparatus which will prevent double counting of a box and which will assist in preventing failure to count a box.

Another object is to provide an apparatus which will automatically make a record of each box as the box is being marked, in accordance with the particular mark stamped on the box.

Another object is to provide an apparatus which will stamp a distinguishing mark on each of a plurality of boxes at corresponding locations on all boxes.

Another object is to provide an apparatus which will mark and count boxes of different sizes without requiring mechanical alterations of the machine.

Another object is to provide an improved box clamping device associated with the apparatus for marking and counting boxes.

Another object is to provide an electric circuit for controlling the marking and counting apparatus to prevent double marking or counting of a box.

These and other objects and advantages of the present invention will be apparent from the following description taken in connection with the following drawings in which:

Figure 1 is a perspective of the marking and counting apparatus of this invention in readiness to receive a box to be marked.

Figure 2 is a perspective, partially broken away, of the apparatus of Fig. 1 as viewed from the opposite side thereof.

Figure 3 is a fragmentary perspective of the apparatus of Fig. 1 viewed from the discharge end thereof and showing a box locked in place and ready to be marked.

Figure 4 is a section taken along lines 4—4 of Fig. 3 and showing certain parts arranged to hold one box in marking position and to prevent other boxes from entering the machine.

Figure 5 is an enlarged fragmentary elevation of a portion of the machine showing the clutch and driving mechanism.

Figure 6 is a fragmentary section taken along lines 6—6 of Fig. 5.

Figure 7 is a detail view in vertical section taken along lines 7—7 of Fig. 1.

Figure 8 is an enlarged fragmentary section taken along lines 8—8 of Fig. 4.

Figure 9 is a fragmentary elevation of a portion of the apparatus taken along lines 9—9 of Fig. 4, certain parts being shown in section.

Figure 10 is a wiring diagram of the electric control circuit of the apparatus of the invention.

Figure 11 is a wiring diagram of the electric counting circuit of the apparatus of the invention.

In general the marking and counting apparatus of this invention comprises a conveyor frame 16 having thereon a conveyor 17 whereby one box B (Fig. 3) at a time is conveyed into a marking station S where the box is immobilized by a box stop 18 and held in a fixed position by a clamping device 19. While the box is thus disposed in the marking station S additional boxes are prevented from entering the same by another box stop 21. A marking device 24 is mounted adjacent the marking station S. In operation of the apparatus an operator visually determines the size and grade of produce contained in the box B, adjusts the marking device 24 accordingly, and then energizes an electrical control circuit 26 (Fig. 10) by actuating a starting switch 27. The control circuit 26 then automatically causes actuation of mechanisms which mark the box B, record the count of the box according to the grade and size of its contents, and release the marked box, allowing it to be conveyed out of the apparatus and permitting another box to take its place.

The conveyor 17 (Figs. 1 and 3) comprises two spaced parallel chains 31 and 32 each of which is trained around a drive sprocket 33 and a driven sprocket 34. Both drive sprockets 33 are rigid with a drive shaft 36 journalled in bearings 37 suitably mounted on the conveyor frame 16 adjacent the discharge end of the machine. The driven sprockets 34 are carried by a shaft 38 (Fig. 4) journalled in bearings 39 suitably mounted on the conveyor frame 16 adjacent the receiving end of the machine. A motor 41 mounted on a lower portion of the conveyor frame 16 is operably connected to the drive shaft 36 by a chain 42 trained around sprockets 43 and 44 (Fig. 5) on the drive shaft 36 and the motor shaft 46, respectively. Thus the motor 41 is adapted to continuously drive the conveyor 17. Consequently when a box B is immobilized in the marking station S the conveyor continues to operate with the upper run of the conveyor 17 in sliding engagement with the bottom of the box.

In order to guide boxes B accurately into the marking station S stationary parallel guide rails 51 and 52 (Fig. 1) are provided at opposite sides of the conveyor 17. The guide rail 52 extends throughout the entire length of the conveyor 17 in which position it is rigidly supported by vertical angle members 53 and 54 (Fig. 4) which are secured to the conveyor frame 16 adjacent opposite ends thereof. The guide rail 51, which is considerably shorter than the rail 52, is mounted on vertical members 56 and 57 (Fig. 1) secured to the conveyor frame 16 and terminates only slightly beyond the longitudinal midpoint of the conveyor 17. Both rails 51 and 52 are outwardly flared at the receiving end of the apparatus.

The clamping device 19, best shown in Figs. 3 and 7, comprises a vertically extending lever 63 consisting of two spaced, parallel, rigidly interconnected arms 62 (Fig. 1). The lever 63 is mounted for pivotal movement in a vertical transverse plane by a bolt 65 carried by a bracket 66 which is secured to a longitudinal member 64 of the frame 16. The clamping device 19 includes a longitudinally extending clamping bar 67 which has outwardly flared ends and which is secured to the upper end of the lever 63. The bar 67 extends parallel to the conveyor 17 in a position spaced laterally outward therefrom. The clamping bar 67 is disposed at the opposite side of the conveyor 17 from the longer guide rail 52 toward which it is adapted to be moved by the lever 63 so as to clamp a box within the marking station S.

An apertured block 68 is pivotally secured to the lower end of the lever 63 between the arms 62 thereof, by bolts 69, and a rod 70 extends slidably through the block 68. A collar 71 is rigidly mounted on the outer end of the rod 70 in position to engage the outboard side of the block 68. The rod 70 extends loosely through a coil spring 72 that is under compression between the inboard side of the block 68 and a yoke 73 on the inner end of the rod 70. The yoke 73 is pivoted to the upper end of a lower lever 74, the bottom end of which is pivotally mounted on a transverse frame member 75. Thus, when the lower lever 74 is turned clockwise (Fig. 3) about its pivotal connection to the frame member 75, the collar 71 engages the block 68 and turns the lever 63 counterclockwise, moving the clamping bar 67 at the upper end of the lever 63 laterally outward; and when the lower lever 74 is turned counterclockwise, pressure of the spring 72 against the block 68 causes the upper lever 63 to turn clockwise, moving the clamping bar 67 laterally inward. Upon engagement of the clamping bar 67 with a box B within the marking station S, movement of the bar 67 and lever 63 ceases, while the yieldability of the spring 72 permits the lower lever 74 to continue to swing, sliding the rod 70 outward through the block and further compressing the spring 72. Thus it is apparent that the clamping device 19 is capable of adapting itself to boxes B of various sizes since the lower lever 74 is enabled to continue its outward movement, regardless of when inward movement of the upper end of the upper lever 63 is interrupted by engagement of its clamping bar 67 with a box B.

A clamp drive mechanism 76 (Figs. 3, 5 and 7) and a clutch mechanism 77 are provided to actuate clamping device 19 (Figs. 1 and 3). The drive mechanism 76 includes a transversely extending shaft 78 (Figs. 1–5 and 7) journaled in bearings 79 (Figs. 3 and 7) and 80 (Figs. 2 and 5) which are mounted on members 81 and 82, respectively, of the frame 16. A cylinder cam 83 (Figs. 1–5 and 7) is secured to one end of the shaft 78 and is engaged by a cam follower roller 84 that is rotatably carried by the lower lever 74 in position spaced above the pivotal mounting of the lever. Accordingly, when the high lobe 83a of the cam 83 engages the follower roller 84, the lower lever 74 is swung outward, or counterclockwise as viewed in Figs. 3 and 7, causing the upper lever 63 to turn in the opposite direction until the clamping bar 67 at the upper end of the lever 63 engages a box B in the marking station S and clamps the box ridgidly therein, as hereinbefore explained. The follower roller 84 is held against the edge of the cam 83 by a coil spring 85 (Fig. 7) carried by a rod 86 and under compression between a bracket 87 rigid with the frame 16 and a nut 88 threaded on the rod 86. The rod 86 extends slidably through the bracket and is pivoted to the upper lever 63 below the pivot bolt 65 of the same, so that the spring 85 continuously urges the upper lever to turn counterclockwise (Figs. 3 and 7) and the lower lever 74 in the opposite direction. Thus it may be seen that the function of the spring 85 in holding the roller 84 against the cam 83 is to effect outward movement of the clamping bar 67 to its retracted, or box-releasing position when the high lobe 83a of the cam 83 moves out of engagement with the cam follower roller 84.

A locking cylinder 90 (Figs. 3 and 5) and a sheave 91 are rigidly secured to the shaft 78 adjacent the end of the same opposite that on which the cylinder cam 83 is mounted. A V-belt 92 is trained around the sheave 91 and around a sheave 93 rigid with the motor drive shaft 46. Normally, the V-belt 92 is so loose that power is not transmitted thereby from the motor shaft 46 to the cam shaft 78; but the clutch mechanism 77 (Figs. 5 and 6) operates to tighten the belt 92 and thus effect operation of the cam shaft 78 upon arrival of a box B within the marking station S. The clutch mechanism 77 comprises a belt tensioning device 102 and a clutch actuating solenoid 103.

The belt tensioning device 102 comprises a generally T-shaped rocker 104 having a substantially vertical leg 106 and a leg 107 rigid therewith and perpendicular thereto. The rocker 104 is pivotally mounted on the frame member 82 by a pin 108 which is secured to a bracket 109 rigid with the frame member 82. A locking roller 111 rotatably mounted on the upper end of the leg 106 is arranged to ride on the periphery of the locking cylinder 90 and to seat in one of two slots 112 in spaced apart relation in the periphery of the cylinder 90 to lock the cylinder and the cam shaft 78 in either of two positions of rotary movement.

A lever 113 having a belt tensioning roller 114 rotatably mounted thereon is pivoted on one end of the horizontal leg 107 of the rocker 104, by a pivot pin 116. A bolt 117 extending through lugs 118 and 119 on the rocker 104 and the lever 113, respectively, carries a spring 120 that is under compression between the lugs 118 and 119 and thus constantly urges the lever 113 in a clockwise direction about its pivot 116, as viewed in Fig. 5, and thus constantly urges the tightening roller 114 toward the belt 92.

Rigid with the opposite end of the leg 107 of the rocker 104 is a cross bar 121 (Figs. 5 and 6) through one end of which a rod 122 extends. A spring 123 is mounted around the rod 122 and is under compression between a nut 124 on the rod 122 and the cross bar 121. The rod 122 is an extension of the armature 125 of the solenoid 103 so that when the solenoid 103 is actuated to move the armature downward, the spring 123 is compressed as the rocker 104 pivots in a clockwise direction as viewed in Fig .5. A bolt 126 (Figs. 5 and 6) extends upward from the opposite end of the cross bar 121 and loosely through a bracket 127 rigid with the frame member 82. A spring 128 under compression between the bracket 127 and a nut 129 on the upper end of the bolt 126, continuously urges the cross bar 121 upward, and thus is effective to return the rocker 104 to the position in which it is shown in Fig. 5, wherein the locking roller 111 is in cylinder-locking position and the belt-tightening roller 114 is withdrawn from its belt-tightening position.

Momentary energization of the solenoid 103 causes the rocker 104 to turn in a clockwise direction (Fig. 5) thus simultaneously releasing the locking cylinder 90 by withdrawing the roller 111 from the slot 112 within which it is seated and applying the roller 114 to the belt thus tightening the belt 92 to rotate the cylinder 90. As the cylinder 90 begins to rotate, the solenoid 103 is deenergized by means to be explained later herein, allowing the locking roller 111 to ride against the locking cylinder 90 until the cylinder turns far enough to move its other slot 112 into position to receive the roller 111. The spring 128 then returns the rocker 104 to its Figure 5 position, entering the roller 111 into said other slot 112 to simultaneously lock the cylinder 90 against further rotation and to loosen the belt 92.

Two clutch control switches 137 and 138 (Figs. 3 and 10) are mounted in positions to be actuated by the lever 74 as the operation of clamping a box B within the marking station S is completed. The switch 138 is mounted on a portion 141 of the conveyor frame 16 in position for its actuating arm 142 to be pivoted into switch-closing position by the lever 74 as the lever approaches the limit of its movement by the cam 83, as shown in Fig. 3. The switch 137 is mounted on a portion 143 of the frame 16 in position for its actuating arm (not shown) to be pivoted into switch-opening position by the lever 74 as the lever arrives at its extreme position of movement by the cam 83, i.e., a brief interval after the switch 138 is closed.

The box stop 21 (Figs. 1 and 4) is located at the inlet end of the machine and operates as an escapement mechanism to permit a single box at a time to enter the marking station S. The box stop 21 includes a pivotally mounted assembly 144 comprising a transverse member 145 and legs 146 at the ends of the transverse member and extending rearward therefrom, i.e., toward the inlet end of the conveyor, where the legs 146 are pivoted by pins 148 (one shown) to the frame 16 to mount the assembly 144 for rocking movement about an axis extending transversely of the conveyor and below the plane of the upper runs of the conveyor chains 31 and 32. Upwardly extending arms 151 (one shown) each having a box stopping roller 153 journalled on the upper end thereof, are secured to the ends of the transverse member 145. When the assembly 144 is in its upper position as shown in Fig. 4, the rollers 153 project into the path of boxes approaching the machine to thus temporarily prevent their movement into the marking station S. In order to release a single box and permit the same to resume its advance to the station S, the rollers 153 are adapted to be retracted below the path of the box as shown in Fig. 1. An inclined roller guide 156 (Fig. 4) and a shoulder 157 on the central portion of the transverse member 145 assist in moving the rollers 153 between these projected and retracted positions. A box stop supporting bracket 158 is disposed below the intermediate portion of the transverse member 145 and is pivoted at its lower end on a pin 159 rigid with and extending between two spaced parallel plates 160 (Figs. 1, 2 and 4) welded to the frame 16. A camming roller 161 is journalled on the upper end of the bracket 158 in position to ride against the roller guide 156 when the bracket 158 is swung forward from its position illustrated in Fig. 4. Rearward motion of the bracket 158 is limited by the shoulder 157, the parts being so arranged that the roller 161 can move under the transverse member 145 of the box stop assembly 144 when the assembly is raised to that position in which the box engaging rollers 153 project above the upper run of the conveyor 17. A spring 162 under compression between the front face of the bracket 158 and a lug 163 on the frame member 160, and guided on a rod 164 constantly urges the bracket 158 toward its box stop assembly supporting position as illustrated in Fig. 4.

Means for automatically returning the box stop assembly 144 to its projected, or operative position are provided comprising a resetting lever 166 (Figs. 1, 3 and 4) secured to a transverse shaft 167 suitably journalled on the conveyor frame 16. The upper portion 168 of the lever 166 is disposed between the conveyor chains 31 and 32 and normally projects above the plane of the upper runs thereof. The lower portion 169 of the lever 166 is apertured to slidably receive a guide link 170. One end of the guide link 170 is pivotally secured to the upper portion of the box stop supporting bracket 158 and lock nuts 171 on the other end of the link 170 prevent disengagement of the link 170 from the resetting lever 166. A helical compression spring 172 mounted on the link 170 is interposed between the lever 166 and a nut 173 (Fig. 4) on the link 170 to provide a resilient actuating means for pivoting the bracket 158 into box stop supporting position. As a box B is conveyed into the marking station S, the box rides over the upper end 168 of the lever 166, depressing the same and causing the lever 166 to turn clockwise as viewed in Figs. 1 and 4. When thus depressed, the lever 166 compresses the spring 172 so that it turns the support bracket 158 counterclockwise (Fig. 4). As the bracket 158 is thus turned, the roller 161 cams the roller guide 156 upward, raising the box stop assembly 144 until the roller 161 passes under transverse member 145. The roller 161 then engages the shoulder 157 so that the shoulder and the spring 172 cooperate to retain the bracket 158 in box stop supporting position. The box holds the lever 166 in depressed position until the box is marked and starts to move out of the marking station, but as the box is released from the marking station S, the lever 166 is freed so that the box stop 21 can be returned to retracted position by means presently to be described, to permit another box to be conveyed into the marking station S.

A normally open switch 174 (Figs. 2, 4 and 10) is mounted on an angle bracket 175 secured to the frame 16 below the receiving end of the conveyor 17, in such position that the actuating arm 176 of the switch 174 is contacted by the box stop supporting bracket 158 and moved thereby to switch closing position when the support bracket 158 raises the box stop assembly 144 to box stopping position. The switch 174, in cooperation with clutch control switches 137 and 138 (Fig. 1), controls the clamping and releasing actions of the clamping device 19.

In order to permit boxes to pass freely through the machine without being marked or counted, an unlocking device 181 (Fig. 4) is provided. The unlocking device 181 comprises a lever 182 rotatably mounted on a pin 183 extending between and welded to the plates 160 below the pin 159 on which the support bracket 158 is pivoted. The upper portion of the lever 182 is adapted to contact a face plate 184 (Figs. 2 and 4) on the support bracket 158 at a point below the pivotal axis thereof. Thus, counterclockwise pivotal movement (Fig. 4) of the lever 182 will cause the support bracket 158 to pivot in a clockwise direction, retracting the inlet box stop rollers 153 to their inoperative position.

A pedal 185 is provided in a position accessible to the operator of the machine, for actuating the lever 182 to allow one or more boxes to pass freely through the machine without being marked or counted. The pedal 185 is rigid with a transverse shaft 186 (Figs. 1, 3 and 4) rotatably mounted in brackets 187 secured to the frame 16 at the discharge end of the machine. A lever 188 rigid with the shaft 186 is adapted to impose tension on a chain 189 when the pedal 185 is depressed. A return spring 191 yieldably resists such operation of the pedal 185 and lever 188. The chain 189 is connected to a pull rod 192 which extends through a fixed guide bracket 194 and through the lower portion of the lever 182. Nuts 196 on the rod 192 pivot the lever 182 counterclockwise (Figs. 4 and 9) when the rod 192 is pulled, thus turning the support bracket 158 clockwise, and permitting the box stop 21 to drop to its retracted position. Therefore, while the operator holds the pedal 185 in its depressed position, boxes are permitted to pass uninterruptedly over the inlet box stop 21. Each box depresses the lever 166, but this has no effect other than to compress the spring 172 so long as the pedal 185 is depressed, holding the support bracket 158 in its inoperative position.

The box stop mechanism 18 at the discharge end of the conveyor 17 comprises a pivotally mounted stop assembly 200 including a transverse shaft 201 (Figs. 1, 3 and 4) suitably journalled on the conveyor frame 16. Two L-shaped arms 203 and 204 are secured to the shaft 201 adjacent the ends thereof. A transversely extending angle bar 206 rigidly interconnects the horizontal ends of the arms 203 and 204 while rollers 207 and 208, respectively, are journalled on the upwardly extending ends of the arms 203 and 204. The assembly is so arranged that the rollers 207 and 208 can be raised into the path of boxes on the conveyor 17 or can be withdrawn to retracted positions below the path of the boxes. The positions of the rollers 207 and 208 when raised is such that they are adapted to engage and stop a box B when the box reaches the proper position within the marking station S to be marked by the marking device 24, as shown in Fig. 3. A roller guide 209 (Figs. 1 and 4) is secured to the angle bar 206 in inclined position extending downward and toward the discharge end of the machine. A spring guide rod 210 is pivotally connected to a crank-arm 211 (Fig. 4) which is rigidly secured to the shaft 201. The rod 210 extends downward through an L-shaped guide bracket 212 rigid with the frame 16. A compression spring 213 on the guide rod 210 is interposed between the bracket 212 and a nut 214 on the lower end of the rod 210 to constantly urge the box stop assembly 200 to turn so as to raise the rollers 207 and 208 into box engaging position.

Means are provided for pivoting the assembly 200 against the urge of the spring 213, to shift the stop rollers 207 and 208 to retracted, or inoperative positions. A substantially vertical lever 215 is pivotally mounted by a bolt 216 on a bracket 217 (Fig. 8) rigid with the hereinabove mentioned frame member 81. A cam follower roller 218 (Fig. 4) is rotatably mounted on the lower portion of the lever 215 and is arranged to ride on the cylindrical surface of the clamp actuating cylinder cam 83 in position to be engaged by a lobe 219 projecting radially therefrom (Figs. 4 and 5). A finger 221 rigid with the upper portion of the lever 215 extends laterally therefrom into position to engage an L-shaped box stop locking lever 222, the vertical leg of which is pivoted between spaced angle brackets 223 rigidly secured to the frame member 81. The horizontal leg 224 of the lever 222 has a pair of rollers 225 journalled thereon. The rollers 225 are arranged to ride against the roller guide 209 and to be cammed thereby to turn the levers 222 and 215 counterclockwise (Fig. 4) as the box stop assembly 200 turns counterclockwise toward box arresting position. As the assembly 200 arrives at this position, the rollers 225 snap over the transverse member 206 as shown in Fig. 4 to lock the box stop 18 in its effective position. The rollers 225 are constantly urged to their locking position by a spring 227 (Fig. 8) which urges the lever 222 to pivot clockwise (Fig. 4). The spring 227 is mounted around a bolt 228 and is under compression between a lug 229 extending rearward from the lever 222 and the frame member 81 thus resisting counterclockwise movement of the lever 222. The bolt 228 extends loosely through aligned holes (not shown) in the lug 229 and frame member 81.

The box stop 18 is automatically caused to retract to disabled position as a consequence of operation of the clamp actuating cam 83 to effect release of the clamping device 19. When the cam 83 is thus operated, the radial lobe 219 of the cam 83 engages the cam follower roller 218 and pivots the lever 215 counterclockwise (Fig. 4) thus effecting withdrawal of the locking rollers 225 from engagement with the transverse member 206 of the box stop assembly 200, thus unlocking the same. The rollers 207 and 208 are thus made incapable of resisting forward motion of the box B within the marking station S, which therefore forces the rollers 207 and 208 downward to their retracted positions below the plane of the upper run of the conveyor 17, so that the box can pass over the rollers and thus be discharged from the apparatus. As soon as the box passes beyond the rollers 207 and 208, the box stop assembly 200 is returned to its operative position by the spring 213 where it is locked by the rollers 225 as hereinabove explained. It should be noted that a stop 230 (Figs. 4 and 8) is welded to the bracket 212 in position to be engaged by the end of the roller guide 209 to prevent excessive counterclockwise movement (Fig. 4) of the box stop assembly 200.

The box marking device 24 (Figs. 2, 3 and 9) includes an auxiliary frame 232 rigid with the conveyor frame 16 and having four supporting legs 233, to each of which a vertical guide channel 234 is rigidly secured. The channels 234 serve as guides for a frame 235 which is vertically adjustable within the fixed auxiliary frame 232. The adjustable frame 235 comprises upper and lower generally rectangular braces 236 and 237, respectively, disposed in spaced horizontal planes, and vertical angle bars 238 that are arranged in four pairs with each pair interconnecting corresponding corners of the rectangular braces 236 and 237. Each pair of angle bars 238 is arranged to present two opposed, parallel, vertical flanges extending at 45° with respect to the adjacent sides of the rectangular braces 236 and 237, thus defining a vertically extending, outwardly facing channel 243 at each corner of the adjustable frame 235. A plurality of rollers 247 journalled within each of the channels 243 of the adjustable frame 235 extend into and make rolling contact with the stationary channels 234 of the stationary frame 232.

In order to facilitate raising and lowering the adjustable frame 235, two balancing devices 250 are provided. At least one of the balancing devices 250 (Fig. 3) includes a tension spring 251 which is connected between an upper portion of the auxiliary frame 232 and a lever 252 which is pivotally connected at one end to a lower portion of the auxiliary frame 232 by a bolt 253. A connecting rod 254 is pivoted to the other end of the lever 252 and to a horizontal brace 256 of the adjustable frame 235 so that the adjustable frame and parts of the marking device 24 carried thereby are supported by the springs 251. A plate 257 having the form of an arc whose center lies within the pivot axis of the lever 252, extends rigidly from the lever adjacent the leg 233 on which the lever 252 is mounted. A locking pin 258 can be releasably inserted through a selected one of a series of holes 259 in the plate 257 and seated into a hole (not shown) in the same leg 233 to releasably retain the movable frame 235 in selected position of vertical adjustment.

The box marking device 24 comprises a marking mechanism 260 (Figs. 1, 2, 3, 4 and 9) and an inking mechanism 261 which are individually pivotally mounted on the adjustable frame 235.

The marking mechanism 260 (Figs. 3 and 9) comprises a pair of spaced arms 262 and 263 which are secured at their lower ends to a shaft 264 journalled in bearings 266 suitably mounted on the adjustable frame 235. A spacer bar 267 (Fig. 2) is secured to and extends between the arms 262 and 263 adjacent the upper ends thereof. A marking drum frame 268 is secured to the spacer bar 267 and to the upper ends of the arms 262 and 263, as by bolts 269. A tube 271 is rotatably journalled in the marking drum frame 268 and has secured thereto a semi-cylindrical grade stamp 272 which has preferably three grade identifying type characters, such as letters 272a (Fig. 4) on its peripheral surface. A control handle 273 is secured to the tube 271 in a position convenient to the operator so that he can easily pivot the handle 273 and thus dispose a selected grade type character 272a in marking position. A type holding bar 274 secured to the drum frame 268 is adapted to carry type characters 274a for imprinting wording that is to appear on all boxes in a given run of the machine, such as the variety of the product packed within the boxes. A size indicator control shaft 276 is rotatable within the tube 271 and is provided with a control knob 277 secured on one end thereof and cylindrical size stamp 278 secured adjacent the other end thereof. The size stamp 278 has a 278a on the peripheral surface thereof, one for each size classification of the produce packed in the boxes to be marked and counted. The stamp holding bar 274, the grade stamp 272 and the size stamp 278 are all spaced at the same distance from the axis of the shaft 276 so that they will simultaneously contact the surface of the box to be marked. The stamping numbers and letters are formed backward and of a suitable printing material such as rubber.

In order to record the number of boxes marked according to each particular grade and size, a circular plate 286 (shown diagrammatically in Fig. 11) is positioned coaxially with respect to the shaft 276 and is fixedly disposed within a housing 287 (Fig. 2) rigid with the marking drum frame 268. The plate 286 is constructed of an electrical insulating material such as Bakelite and is provided with a plurality of equally spaced electrical contact points $P_1$, $P_2$, $P_3$, etc. One such contact point is provided for each size indicating number 278a on the size stamp 278. An insulated contact arm 291 rigid with the shaft 276 adjacent the plate 286, is provided with a single contact point 292 which, upon rotation of the shaft 276, selectively contacts the points $P_1$, $P_2$, $P_3$, etc., one for each size classification of the produce packed in the boxes to be marked. When the operator sets the cylindrical size stamp 278 to a selected size classification, the single contact point 292 will contact only one of the points P to establish electrical connection therewith.

The grade stamp 272 carries three contact points $R_1$, $R_2$ and $R_3$ (indicated diagrammatically in Fig. 11) one for each of the three grade classifications of the produce packed in the boxes to be marked. A single contact point 297 is carried by an insulated contact arm 298 rigid with the marking drum frame 268 and is disposed in a position which will cause it to selectively establish electrical contact with the points $R_1$, $R_2$, and $R_3$ upon rotary movement of the grade stamp 272.

In order to cause the marking mechanism 260 to press its type characters 272a, 274a and 278a against a box B, a marking solenoid 301 (Figs. 2, 9 and 10) is provided. The solenoid 301 is secured to the lower rectangular brace 237 of the adjustable frame 235. A rod 303 that is an extension of the armature 304 (Fig. 2) of the marking solenoid 301 extends upward through an aperture in the stem end of a T-shaped actuating lever 306. A compression spring 307 on the rod 303 is disposed between the lever 306 and a nut 308 on the upper end of the rod 303. An upwardly projecting arm 309 of the lever 306 is apertured to receive a pin 310 which pivots the arm 309 to a bracket 311 rigid with the adjustable frame 235. A downwardly extending arm 312 of the T-shaped lever 306 is pivotally secured to one end of a link 318 by a pin 319. The other end of the link 318 is secured to a shaft 321 that extends parallel to the shaft 264. Crank arms 322 rigid with the shaft 264 are pivotally connected to the shaft 321. Thus, when the marking solenoid 301 is energized, the rod 303 is moved downward to compress the spring 307 so that it exerts a downward force on the lever 306, pivoting the same about the pin 310 and thereby lifting the link 318 to turn the shaft 264 in a counterclockwise direction as viewed in Fig. 9 to swing the marking mechanism 260 into engagement with the box B.

A normally closed marking switch 326 (Figs. 9 and 10) is secured to the adjustable frame 235 in position for its actuating arm 328 to be engaged by the arm 262 and be swung thereby to switch opening position as the marking stroke of the arm 262 is completed. As will presently be explained, the marking switch 326 is connected into the energizing circuit of the solenoid 301 and consequently opening the switch 326 permits the marking mechanism to return to retracted position as shown in Fig. 9, under the influence of a spring 329 which is connected between the arm 262 and the movable frame 235.

Vertically extending angle bars 331 (Fig. 2) rigid with the adjustable frame 235, carry padded stops 333 against which the arms 262 and 263 rest when the marking mechanism 260 is in retracted position as shown in Fig. 3.

The aforementioned inking mechanism 261 applies ink to the type characters 272a, 274a and 278a before the characters are applied to a box. The inking mechanism 261 (Fig. 9) comprises an inking pad 338 carried by a pair of arms 339 and 340 (Fig. 4) that are secured to a shaft 341 (Fig. 9) rotatable in bushings 342 carried by the angle bars 331. A crank arm 344 (Fig. 9) is secured to the shaft 341 and is connected to one end of a chain 346. The other end of the chain 346 is attached to a bracket 348 which, in turn, is pivotally mounted on the upper brace 236 of the adjustable frame 235. A rod 349 that constitutes an extension of the armature 350 of an inking solenoid 351 mounted on the adjustable frame 235, is pivotally attached to the pivoted bracket 348. The rod 349 extends through a suitably apertured support strap 354 secured to the body of the solenoid 351, and a helical compression spring 357 on the rod 349 between the support strap 354 and a nut 355 on the rod 349 constantly urges the rod 349 upward. A tension spring 358 (Fig. 2) connected between the upper frame member 236 and a crank arm 359 on the shaft 341, retards and cushions the return stroke of the inking mechanism 261.

In order to ink the selected type characters 272a, 274a and 278a, the inking solenoid 351 is energized, to move the rod 349 downward. This pivots the crank arm 348 so that it pulls the chain 346 downward to rotate the shaft 341 in a clockwise direction (Fig. 9). In this manner the arms 339 and 340 are turned, causing them to carry the ink pad 338 into engagement with the particular type characters 272a, 274a and 278a in marking position on the grade stamp 272, type bar 274 and size stamp 278, respectively.

A normally closed inking switch 362 (Figs. 2 and 9) is mounted on a plate 363 which is secured, to the angle bar 331 of the movable frame 235. A cam 365 is secured to the shaft 341 and is arranged to contact the actuating arm 366 of the switch 362 and thus open the switch 362 when the shaft 341 is rotated to the position in which the inking pad 338 is in contact with the type characters. Thus, the inking solenoid 351 is de-energized upon completion of the operating stroke of the inking mechanism 261, allowing the shaft 341 to pivot counterclockwise (Fig. 9) which permits the inking pad 338 to gravitate to its retracted position shown in Fig. 9.

The electrical control circuit 26 and the cycle of operation of the apparatus of this invention are so closely associated, that both will be described simultaneously. It will be assumed that an operating cycle starts with a box B clamped in the marking station S. The inlet and discharge box stops 21 and 18, respectively, are locked in box intercepting positions, as shown in Fig. 4, and the clamping device 19 is clamped against the box B as shown in Fig. 3. The motor 41 is continuously driven while the apparatus remains in operation, thus continuously driving the conveyor so that its upper run moves to the right as viewed in Fig. 1. Power of a predetermined voltage is supplied by lines $L_1$ and $L_2$ (Fig. 10) while power preferably at a higher voltage is supplied through the main lines $L_3$ and $L_4$. With the apparatus thus made ready for operation, the operator visually determines the size and grade of fruit which is packed in the box in the marking station S and then manually sets the marking device 24 accordingly.

The operator then closes the starting switch 27 (Fig. 10) which causes current to flow through the main line $L_1$, the closed switch 138, conductors 376 and 377, a normally closed contact $A_1$ of a relay A, a conductor 381, a normally closed contact $B_1$ of a relay B, a conductor 384, the starting switch 27, a conductor 386, the coil of a relay C, and through a conductor 388 which is connected to the main line $L_2$ thus completing the circuit. In this manner, the relay C is energized to close its contacts $C_1$ and $C_2$ which are included in a counting circuit and an inking circuit, respectively.

The counting circuit includes the conductor 384 and the portion of the previously described circuit which connects the conductor 384 to the main line $L_1$. The counting circuit further includes a conductor 389, contact $C_1$ of the relay C and a conductor 391 which is connected to a terminal 392 (Figs. 10 and 11). This terminal is electrically connected to the hereinbefore mentioned contact arm 291 (Fig. 11). The main line $L_2$ is connected to the counting circuit by a conductor 395 (Fig. 10) which leads to a terminal 396 (Figs 10 and 11) of the counter control circuit 394 (Fig. 11). This counter control circuit 394 is completed through a selected one of a plurality of counters $D_1$, $D_2$, $D_3$, etc., (Fig. 11) as will presently be described.

The inking circuit likewise is connected to the conductor 384, and includes a conductor 397, the contact $C_2$, a conductor 398, the inking switch 362, a conductor 399, the coil of a magnetic switch E, and a conductor 401 which is connected to the main line $L_2$ thus completing the inking circuit. Hence, upon closing the contact $C_2$, as hereinabove described, the magnetic switch E is energized to close contacts $E_1$ and $E_2$, thus connecting the high voltage main lines $L_3$ and $L_4$ to the inking solenoid 351 to energize the same. This causes the ink pad 338 to pivot upward into contact with the particular numbers and letters of the stamping mechanism 24 which have been selected to be printed on the box. As the ink pad 338 engages the type characters, the cam 365 (Fig. 2) moves the actuating arm 366 of the ink pad control switch 362, as hereinabove described, causing the movable contact of the switch 362 (Fig. 9) to open the inking circuit and to complete a stamping circuit by engaging a terminal 404. Breaking the inking circuit deenergizes the magnetic switch E thus opening the high voltage circuit to the ink pad solenoid 351 and allowing the ink pad 338 to return to its retracted position as shown in Fig. 3.

While the inking circuit is thus energized for an interval long enough to complete the inking operation, the relay C continues to hold the contact $C_2$ closed. Therefore, engagement of the movable contact of the switch 362 with the contact 404, as hereinabove mentioned, causes the terminal 404 to be connected to the main line $L_1$. This terminal 404 controls a temporary holding circuit, which includes conductors 406 and 407, the coil of a relay B, conductors 408 and 409, marking switch 326, and a conductor 411 that is connected to the main line $L_2$.

Therefore, actuation of the switch 362 by engagement of the cam 365 (Fig. 2) and the arm 366 when the inking operation is completed, causes energization of the relay B which opens contact $B_1$ and closes contacts $B_2$ and $B_3$. In opening the contact $B_1$, the circuit for the starting switch 27 and the circuit for the relay C are broken thus preventing double counting of a box even if the switch 27 is again closed. As previously mentioned, the inking switch 362 is only temporarily actuated to energize the holding circuit that includes the terminal 404. However, the relay B remains energized through a holding circuit which comprises the conductor 381 (which receives current from the main line $L_1$ as already described) a conductor 412, the contact $B_2$, a conductor 413, the conductor 407, the coil of the relay B, the conductors 408 and 409, the marking switch 326, and the conductor 411 which is connected to the main line $L_2$.

The effect of closing the contact $B_3$ is to complete a marking circuit which comprises the conductor 381 (which remains electrically connected to the main line $L_1$ as above explained), a conductor 416, the contact $B_3$, a conductor 417, the coil of a magnetic switch F, a conductor 418, the conductor 409, the marking switch 326 and the conductor 411 which is connected to the main line $L_2$ thus completing the marking circuit. The contacts $F_1$ and $F_2$ of the magnetic switch F are thus closed, completing a high voltage circuit which actuates the marking solenoid 301 and causes the box marking mechanism 260 (Fig. 9) to pivot into marking engagement with the end of the box B.

As the marking mechanism is thus actuated the marking switch 326 (Figs. 9 and 10) is temporarily actuated to break the aforementioned holding circuit, allowing the relay B and magnetic switch F to return to their initial positions. This permits the marking mechanism 260 to begin its return stroke. Upon breaking the holding circuit of the relay B and the magnetic switch F, the switch 326 makes electrical contact with a terminal 421 to close another temporary holding circuit which energizes the relay A. This temporary holding circuit comprises the switch 138 which is connected to the main line $L_1$, the conductor 376, a conductor 422, the coil of the relay A, a conductor 423, the marking switch 326, and the conductor 411 which is connected to the main line $L_2$.

One effect of energizing the relay A is to open the contact $A_1$ and thereby prevent current from flowing to the relay B. This eliminates any possibility of accidentally actuating the marking device 24 a second time for a particular box.

Another effect of energizing the relay A is to close a contact $A_2$ and thereby complete a clutch circuit. This clutch circuit comprises the switch 138 that is connected to the main line $L_1$, a conductor 428, the contact $A_2$, conductors 429 and 431, the coil of a magnetic switch G and a conductor 432 which is connected to the main line $L_2$. Accordingly, when the clutch circuit is completed, the contacts $G_1$ and $G_3$ of the magnetic switch G complete a high voltage circuit which energizes the clutch actuating solenoid 103 to effect withdrawing of the locking roller 111 (Fig. 5) from the cylindrical locking member 90 and tightening the belt 92 to rotate the clamp driving mechanism 76 through approximately one half revolution. As this occurs, the radial lobe 219 (Fig. 4) engages the follower 218 and pivots the control lever 215 and the locking lever 222 in a counterclockwise direction (Fig. 4), thus unlocking both the intake and discharge box stops 21 and 18.

Likewise, while the driving mechanism 76 (Fig. 3) rotates through the above mentioned approximate half revolution, the lobe 83a of the clamp actuating cam 83 rotates away from the cam follower roller 84, permitting the lower lever 74 to pivot clockwise (Fig. 3), thereby releasing the clamping device 19 and allowing the stamped box to be discharged and another box to enter the marking station S, as hereinabove explained. As the lever 74 is thus pivoted, the actuating arm 142 of the switch 138 opens the switch 138 (Figs. 3 and 10) thus breaking the above described clutch circuit. This deenergizes the solenoid 103, allowing the locking roller 111 (Fig. 5) to ride on the surface of the locking cylinder 90 until roller 111 becomes engaged in the second slot 112, thus preventing further rotation of the driving mechanism 76.

It is to be observed that another effect of opening the switch 138 is to disable the relay A, thus closing the contact $A_1$ and opening the contact $A_2$, returning them to their initial position. Additionally, the switch 326 is returned to its initial position during the return stroke of the marking mechanism 260. Another detail to be borne in mind is that after opening the switch 138, the lever 74 closes the switch 137. This occurs while the locking cylinder is experiencing the above mentioned half turn.

When the box B whose marking has been completed advances out of engagement with resetting lever 166, the lever 166 turns counterclockwise (Fig. 4) allowing the support bracket 158 to be lowered to its retracted position (Fig. 1) as already explained. This effects opening of the switch 174 which is connected in series with the switch 137 and the magnetic switch G. In this connection it is important to note that the switch 174 is thus opened before the switch 137 is closed, because otherwise the magnetic switch G would be prematurely energized at the time of closing the switch 137.

The switch 174 remains in open position until the next succeeding box depresses the resetting lever 166 while entering the marking station S. At this time the lever 166 lifts the support bracket 158 which closes the switch 174 at the same time that it returns the inlet box stop 21 to operative position. Thus, the magnetic switch G is re-energized, causing the clutch solenoid 103 to unlock the locking cylinder 90 and to cause the drive mechanism 76 to resume its rotary motion. During the second half turn of the drive mechanism 76 thus initiated, the clamping mechanism 19 is forced into clamping engagement with the box that has just arrived in the marking station S (Fig. 3). The resumed rotation of the drive mechanism 76 continues until the second half turn has been completed. The locking roller 111 then re-enters the first slot 112, locking the drive mechanism 76 in its starting position. This is the final step in returning the entire apparatus to its initial condition, thus placing the machine in readiness for the commencement of another operating cycle.

The operator can unlock the discharge and inlet box stops 18 and 21 by depressing the pedal 185, as hereinabove explained. It should be noted, however, that in order to allow a box to pass freely through the apparatus, the pedal 185 must be continuously depressed while the box is contacting the lever 166 in order to prevent the closing of the switch 174 which would activate the clutch solenoid 103 and thus cause the clamping device 19 to become clamped on the box before the box passes beyond the marking station S.

As previously mentioned, counter control circuit 394 (Fig. 11) is connected to the counting circuit by the terminals 392 and 396, the terminal 392 being connected to the single contact point 292 of the contact arm 291 of the size stamp 278, and thus adapted to selectively engage one of a plurality of contact points $P_1$ to $P_{18}$, inclusive. Likewise as previously explained, the terminal 396 is connected to the single contact point 297 of the contact arm 298 of the grade stamp 272 and thus is adapted to selectively engage a selected one of three contact points $R_1$, $R_2$ and $R_3$, respectively.

A signal board indicated diagrammatically at 435 is mounted either adjacent the marking machine or at any suitable remote point. The hereinabove mentioned counters $D_1$, $D_2$, $D_3$ are mounted on the signal board 435 in groups $436a$ to $436r$, inclusive. The number of such groups corresponds to the number of size classifications of the produce packed in the boxes to be counted—in the present instance eighteen groups 436 being provided, since the present embodiment of the invention is designed for use in connection with fruit commonly graded according to eighteen size classifications. Each group 436 consists of three counters, and the groups 436 are aligned one above the other, thus arranging the counters in three columns $437a$, $437b$ and $437c$, respectively.

Each of the contact points $P_1$, $P_2$, $P_3$, etc., is connected to one terminal of each of the three counters D in one of the groups 436 by conductors $S_1$ through $S_{18}$ respectively. Each of the contact points $R_1$, $R_2$ and $R_3$ is connected to the opposite terminal of each of the counters D in one of the columns 437 by a conductor $T_1$, $T_2$ or $T_3$, as the case might be.

After visually determining the size and grade of the fruit in a box B within the marking station S the operator adjusts the control knob 277 (Fig. 3) to set the size stamp 278 into that position in which the type character $278a$ corresponding to the particular size classification of the fruit within the box B, is disposed in marking position. This automatically adjusts the arm 291 to engage the adjustable contact point 292 with the corresponding contact point P on the plate 286. Likewise, the operator manipulates the control handle 273 to adjust the grade stamp 272 to that position in which its type character $272a$ corresponding to the particular grade classification of the fruit within the box B, is disposed in marking position. This automatically brings the appropriate contact point $R_1$, $R_2$, or $R_3$, as the case might be, into engagement with the contact point 297 on the contact arm 298.

For the purpose of illustration, let it be assumed that the box about to be marked contains fruit of the best grade and largest size, and that accordingly the grade stamp 272 is set to imprint the character "A," and the size stamp 278 is set to imprint a number indicating the number of pieces of fruit of the largest size that can be packed within one of the boxes. This arrangement of the stamps 278 and 272 will engage the contact point $R_1$ with the contact point 297, and will engage the adjustable contact point 292 with the contact point $P_1$, as illustrated in Fig. 11.

Accordingly, when the counting circuit is energized as a consequence of closing the starting switch, as hereinabove described, current flows from the terminal 392 to and through the contact point 292; contact point $P_1$, conductor $S_1$, counter $D_1$, conductor $T_1$, contact points $R_1$ and 297, and terminal 396 thus completing the circuit and recording on the counter $D_1$ the count of the box within the marking station S. Since the counter controls can be adjusted to cause the contact arms 291 and 298 to engage any of the points P and R, respectively, it is possible to count the particular box being marked on any one of the forty-eight individual counters D. It will be understood that the electrical circuit to each counter D is similar to the above described circuit to the counter $D_1$.

Thus it may be seen that the marking and counting apparatus of this invention will dependably and rapidly mark boxes according to the particular size and grade classification of produce contained therein and will make a record of the number of boxes containing produce of each classification. The apparatus will also prevent double marking and double counting of a box.

While one embodiment of the present invention has been shown and described, it will be understood that various changes and modifications may be made without departing from the spirit of the invention or scope of the appended claims. Having thus described the present invention and the manner in which the same is to be used, what is claimed as new and desired to be protected by Letters Patent is:

1. In an apparatus for marking boxes, a box clamp comprising a frame, a clamping arm pivotally mounted on said frame for movement into box clamping position, a lever pivotally mounted on the frame adjacent said clamping arm, means on said frame for operating the lever, and means connecting the clamping arm to the lever to be moved thereby, said connecting means being yieldable upon engagement of the clamping arm with the box to permit continued movement of the lever after engagement of the clamping arm with a box whereby the box clamp adapts itself to boxes of different sizes.

2. In an apparatus for marking boxes, a box clamping device for positioning a box in a predetermined marking position, comprising a frame, a clamping arm pivotally mounted on the frame for movement to and from clamping position, a lever pivotally mounted on the frame adjacent the clamping arm, a cam rotatably mounted on said frame and constructed and arranged to operate said lever, means for rotating said cam, means connecting the clamping arm to the lever to be moved thereby into clamping position, said connecting means being yieldable upon engagement with a box to permit continued movement of the lever after engagement of the clamping arm with a box whereby the clamp adapts itself to boxes of different sizes.

3. Box handling apparatus comprising a frame having a guide rail, a conveyor mounted on said frame, a box clamp pivotally mounted on said frame for movement between a position spaced from a box adjacent said guide rail and a position clamping the box against said guide rail, a box stop assembly pivotally mounted on said frame for movement to a raised position and including means adapted to intercept a box on said conveyor when the assembly is in said raised position, an inclined guide rigid with said assembly, a support bracket pivotally mounted on said frame, means on the support bracket in position to engage said inclined guide to thereby raise the assembly into said raised position and to move under the assembly to support the assembly in said raised position, a lever pivotally mounted on said frame and arranged to project into the path of a box moving on said conveyor, means connecting the support bracket to the lever to be actuated thereby when a box on the conveyor pivots said lever, and drive means associated with said box clamp and with said support bracket and arranged upon actuation of said support bracket to raised position to move said clamp into position to clamp said box against said guide rail.

4. Box handling apparatus comprising a frame having a guide rail, a conveyor mounted on said frame, a box clamp pivotally mounted on said frame for movement between a position spaced from a box adjacent said guide rail and a position clamping the box against said guide rail, a box stop assembly pivotally mounted on said frame for movement to a raised position, abutment means on said assembly in position to intercept a box on the conveyor when the assembly is in said raised position, an inclined roller guide on said assembly, a support bracket pivotally mounted on the frame adjacent the roller guide, a roller on said support bracket in position to ride against said guide to raise the assembly and to support the assembly when the assembly reaches said raised position, a lever pivotally mounted on said frame and arranged to project into the path of a box on said conveyor whereby movement of the box actuates the lever, means interconnecting said lever and said support bracket whereby upon actuation of the lever the support bracket carries the roller against the inclined roller guide and raises the assembly into said raised position and carries the roller under the assembly to retain the assembly in said raised position, drive means associated with said box clamp and with said support bracket and arranged upon actuation of said support bracket to raised position to move said clamp into position to clamp said box against said guide rail.

5. Box handling apparatus comprising a frame having a guide rail, a conveyor mounted on said frame, a box clamp pivotally mounted on said frame for movement between a position spaced from a box adjacent said guide rail and a position clamping the box against said guide rail, a box stop assembly pivotally mounted on said frame for movement to a raised position, abutment means on said assembly in position to intercept a box on the conveyor when the assembly is in said raised position, an inclined roller guide on said assembly, a support bracket pivotally mounted on the frame adjacent the roller guide, a roller on said support bracket in position to ride against said guide to raise the assembly and to support the assembly when the assembly reaches said raised position, a lever pivotally mounted on said frame and arranged to project into the path of a box on said conveyor whereby movement of the box actuates the lever, means interconnecting said lever and said support bracket whereby upon actuation of the lever the support bracket carries the roller against the inclined roller guide and raises the assembly into said raised position and carries the roller under the assembly to retain the assembly in said raised position, and drive means for moving said box clamp away from said box and simultaneously for withdrawing said support bracket from supporting relation with said assembly and for temporarily retaining the support bracket in withdrawn position, said assembly and said abutment means being movable to an inoperative position upon withdrawal of the support bracket from supporting relation with the assembly, said interconnecting means being resilient to permit the assembly to remain in said inoperative position upon movement of the lever by a box while the support bracket is retained in said withdrawn position.

6. Article marking and counting apparatus comprising a continuously moving conveyor for advancing articles along a fixed path to a marking position, abutment means associated with said conveyor and arranged to be moved to and locked in article arresting position in the path of an article being advanced by said conveyor, means responsive to the presence of a first article in said marking position for moving said abutment means into the path of a second article immediately behind said first article, clamping means mounted adjacent said conveyor and arranged to clamp the first article in said marking position transversely of said conveyor, marking means mounted adjacent said conveyor in opposed relation to said clamping means and arranged to be moved into marking engagement against the first article, means for moving said marking means, a rotatable shaft mounted below said conveyor and adjacent said abutment means and said clamping means, first camming means movable with said shaft and operatively connected to said abutment means and arranged to selectively lock said abutment means in the path of the second article and thereafter to unlock said abutment means, a second camming means on said shaft coordinated with said first camming means for selectively moving said clamping means into clamped position against the first article when said abutment means is locked in the path of the second article and for thereafter moving said clamping means away from the first article when the abutment means is unlocked, a cylinder on said shaft having two slots spaced approximately 180° apart, a sheave secured to said shaft, a motor having a continuously rotating element, a drive sheave keyed on said continuously rotating element, a flexible belt loosely trained around said sheaves, a pivotally mounted belt tensioning device having a first roller arranged to ride against said belt to tighten the same and a second roller arranged to ride against said cylinder to cause said first roller to be moved to belt tensioning position, said second roller being arranged to move into one of said slots to simultaneously lock said shaft in fixed position and to release tension on said belt, means for actuating said belt tensioning device, and control means associated with the actuating means for said belt tensioning device and associated with the actuating means for said marking means and responsive to the presence of an article in said marking position for actuating said belt tensioning device to cause an initial rotation of said shaft through approximately 180° to lock said abutment means in arresting position and to move said clamping means into article clamping position prior to the marking of the first article and thereafter to again actuate said belt tensioning device to rotate said shaft through a second approximately 180° to move said clamping means to unclamping position and to unlock the abutment means.

7. An apparatus for marking and counting articles comprising a conveyor for moving the articles individually to a predetermined position, means operatively connected to said conveyor for locking an article in said predetermined position, marking means disposed transversely of said conveyor and arranged to be actuated into marking engagement with said article, means for recording the number of articles marked, control means operably dependent upon presence of one of the articles within said predetermined position and operable to control actuation of said marking means and said recording means, said control means including means for disabling said marking means and said recording means after each actuation thereof, and means included in said control means for maintaining said disabling means effective until the article is removed from said predetermined position and another article is moved into said predetermined position to prevent double marking and double counting of an article.

8. An apparatus for marking and counting articles comprising a conveyor for moving the articles individually to a predetermined position, means operatively connected to said conveyor for locking an article in said predetermined position, marking means constructed and arranged to mark an article in said predetermined position, means for recording the number of articles marked, means for actuating the recording means, means operable in response to operation of the recording means for actuating the marking means, and means for disabling said actuating means for said marking means and said recording means, said disabling means being activated by an article departing from said predetermined position for preventing actuation of both said marking means and said recording means and being deactivated by an article approaching said predetermined position to prepare said marking means and said recording means for marking and recording said approaching article.

9. Apparatus for marking and counting articles comprising a conveyor for moving an article to a predetermined position, means associated with said conveyor for locking the article in said predetermined position, marking means mounted adjacent said conveyor and having a plurality of size stamps individually movable to marking position and a plurality of grade stamps individually movable to marking position independently of the size stamps, said marking means being arranged to be actuated into marking engagement with the article to mark on the article impressions of a selected size stamp and a selected grade stamp disposed in marking position on the marking means, recording means arranged to record the number of articles marked with each particular combination of size and grade indicating impressions, and electrical control means operatively associated with said marking means and with said recording means and arranged to control the actuation of said marking means and said recording means, said electrical control means including a switch arranged to be opened by the actuation of said marking means for rendering said recording means inoperative until the article is removed from said marking position and another article is moved into said marking position.

References Cited in the file of this patent

UNITED STATES PATENTS

| | | |
|---|---|---|
| 1,427,843 | Pogue | Sept. 5, 1922 |
| 1,430,749 | Overlock et al. | Oct. 3, 1922 |
| 1,452,713 | Stortz | Apr. 24, 1923 |
| 1,595,287 | Buss | Aug. 10, 1926 |
| 2,033,603 | Anderson | Mar. 10, 1936 |
| 2,081,256 | Van Berkel | May 25, 1937 |
| 2,119,053 | Paxton | May 31, 1938 |
| 2,121,821 | Paxton | June 28, 1938 |
| 2,125,528 | Twomley | Aug. 2, 1938 |
| 2,177,075 | Paxton | Oct. 24, 1939 |
| 2,740,351 | Anderson | Apr. 3, 1956 |
| 2,759,590 | Thorton et al. | Aug. 21, 1956 |
| 2,770,350 | Hoffmeister | Nov. 13, 1956 |
| 2,771,177 | Cutter et al. | Nov. 20, 1956 |
| 2,850,241 | Kilborn | Sept. 2, 1958 |

UNITED STATES PATENT OFFICE
CERTIFICATE OF CORRECTION

Patent No. 2,927,527                      March 8, 1960

John A. Bradford

It is hereby certified that error appears in the printed specification of the above numbered patent requiring correction and that the said Letters Patent should read as corrected below.

Column 3, line 62, for "actuate clamping" read -- actuate the clamping --; column 9, line 11, after "a" insert -- series of size indicating type characters, such as numbers --.

Signed and sealed this 11th day of April 1961.

(SEAL)
Attest:
ERNEST W. SWIDER
Attesting Officer

ARTHUR W. CROCKER
Acting Commissioner of Patents